June 24, 1930.  C. TAYLOR  1,765,747
FREEZER FOUNTAIN
Filed Nov. 30, 1928  2 Sheets-Sheet 1
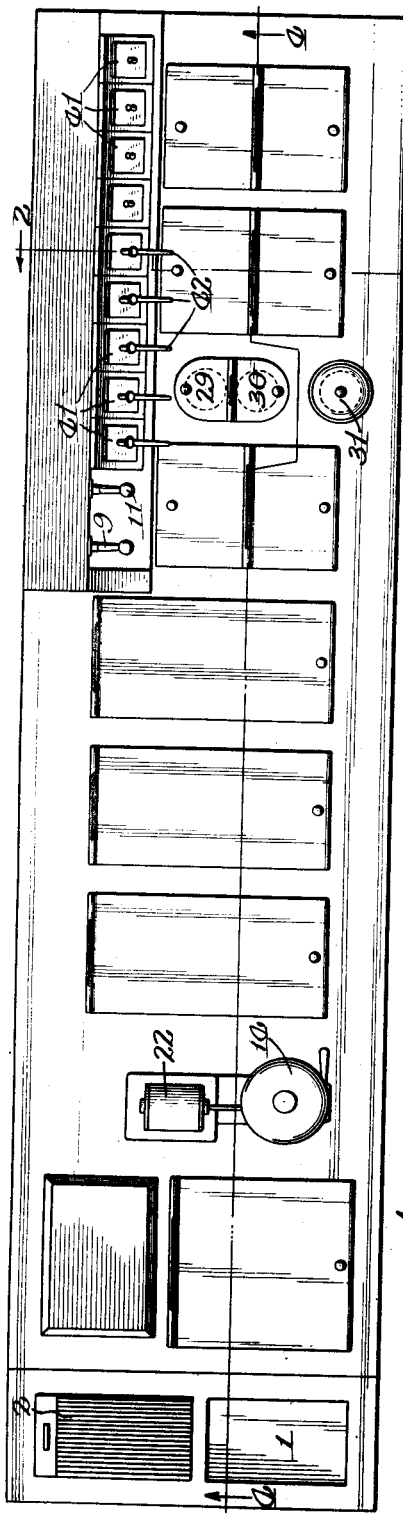
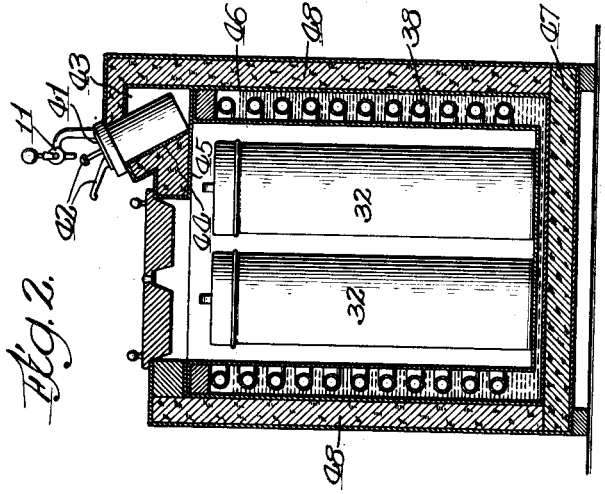
Inventor:
Charles Taylor
By: Ira J. Wilson, Atty June 24, 1930.  C. TAYLOR  1,765,747
FREEZER FOUNTAIN
Filed Nov. 30, 1928   2 Sheets-Sheet 2
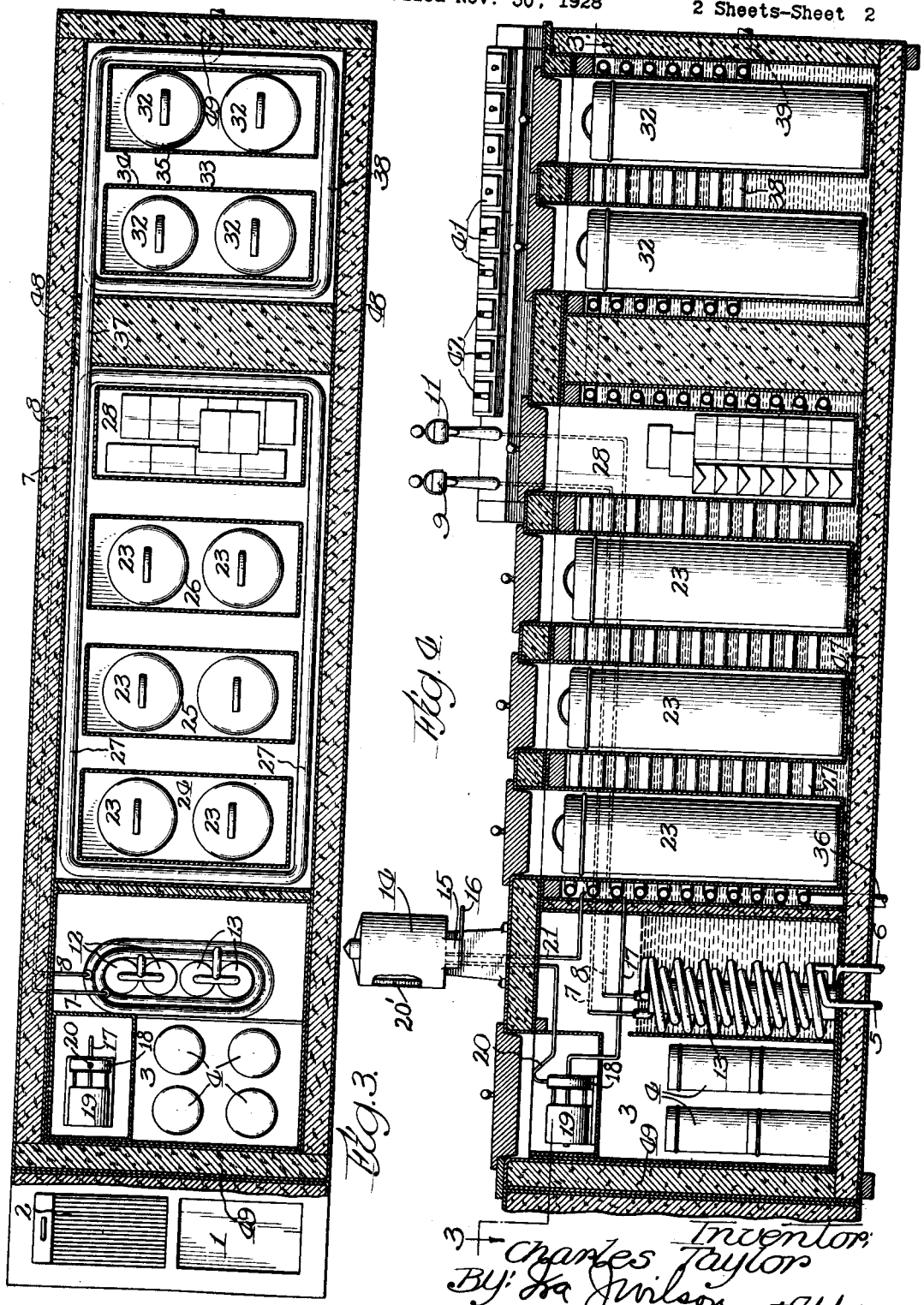

Patented June 24, 1930

1,765,747

UNITED STATES PATENT OFFICE

CHARLES TAYLOR, OF BELOIT, WISCONSIN, ASSIGNOR TO TAYLOR FREEZER CORPORATION, OF SOUTH BELOIT, ILLINOIS, A CORPORATION OF DELAWARE

FREEZER FOUNTAIN

Application filed November 30, 1928. Serial No. 322,856.

This invention relates to fountains for use in retail establishments such as in drug stores, candy stores and the like.

The proprietors of such stores ordinarily are obliged to provide for their clientele ice cream which can be served in small portions to be consumed upon the premises with or without such additions as various syrups or fruits. They have also the task of serving mixed drinks which include as ingredients water, carbonated water and various syrups. Some of the ice cream which is sold is not consumed upon the premises but is carried out either in bricks which are ready for immediate delivery or in packages which are filled by the clerk as ordered. Heretofore it has been customary for the proprietor to buy the ice cream already frozen and hardened from large distributors of ice cream who serve many other stores. He could store only a very limited quantity in his fountain and had no other place of storage. He was obliged to anticipate his demands several hours in advance of the demands in order to obtain delivery from the nearest wholesale manufacturer. On many occasions it was impossible for him to obtain delivery of extra large quantities due to the inability of the manufacturer to supply simultaneous demands from a large number of retail dealers. The disadvantages of this method of obtaining supplies have been generally recognized for many years but the remedy has until now not been discovered.

This invention aims to provide the proprietors of the retail establishments with equipment which will make possible the elimination of the above mentioned disadvantages.

By means of this invention the proprietor is able to make his own ice cream upon the premises and to harden and condition the ice cream for sale. Not only are these new results obtainable from the use of this invention, thus eliminating the above mentioned disadvantages which arise from obtaining the ice cream from wholesale manufacturers, but other new advantages which had no previous existence are made available to the proprietor by this invention. All of the equipment necessary for rendering a complete fountain service is incorporated in a single unit together with the ice cream making, storing, hardening and tempering equipment.

One of the objects of this invention is to provide in a compact unitary structure apparatus for the freezing and hardening of ice cream and for the conditioning of the cream for sale.

Another object of this invention is to provide in a unitary structure a plurality of compartments serving different purposes and provided respectively with different temperatures simultaneously produced by one or more refrigerating machines as desired or required.

Another object of this invention is to provide in a single unitary structure not only the apparatus for the making and conditioning of the ice cream but also means for cooling and maintaining in a desired condition quantities of the mixture intended to be subsequently frozen.

Another object of this invention is to provide in a single unitary structure not only the means for accomplishing the above objects but also means for suitably cooling the carbonated water, plain water, and the syrups and fruits which are required for ordinary fountain service.

Other objects, advantages and capabilities of this invention are inherently possessed by it and will later become apparent.

In the drawings which illustrate the invention

Fig. 1 is a plan view of the entire fountain,

Fig. 2 is a vertical cross section on the irregular line 2—2 of Fig. 1,

Fig. 3 is a horizontal cross section on the line 3—3 of Fig. 4, and

Fig. 4 is a longitudinal vertical sectional view taken on the line 4—4 of Fig. 1.

Referring in greater detail to the drawings and referring to Fig. 1, at one end of the fountain there are provided a sink 1 and drain board 2 conveniently located for use of the dispenser, and adjacent which is provided a compartment 3 in which the ice cream mix is stored in cans 4 prior to being frozen. In the next compartment are provided coils 5 and 6 connected to the pipes 7 and 8 respectively for conducting cold water to the cold water faucet 9 and for conducting carbonated water to the carbonated water faucet 11, respectively. Inside of the coils, as shown in Fig. 3 are located cans 12 for containing an additional supply of cold water and cans 13 for containing an additional supply of carbonated water. These cans are connected respectively to the proper coils and supplement the capacity of these coils.

Above the water coils mounted on the top of the cabinet is an ice cream freezer 14 into which the mix is placed and frozen until it has swelled sufficiently and attained a satisfactory semi-solid condition which will yet permit it to flow out through the outlet 15 which is controlled by the valve handle 16. The brine or other non-freezing solution for cooling the freezer is obtained from the large quantity of brine or other non-freezing solution which surrounds the coils in the hardening compartments and after being used by the freezer is returned to the body of brine from which it was withdrawn, or it may be returned to the other body of brine. Brine might also be taken from the dispensing compartment, but it is preferable to use the brine from the hardening compartment, as the latter had a temperature preferably of about −5° F. The pipe 17 carries this brine from adjacent the coils to a pump 18 driven by a motor 19 which pumps the brine through the pipe 20 into the freezer. The brine circulates through the cylinder jacket 20′ of the freezer, details of which need not be shown here, and returns to the pipe 21 into the main body of brine. A motor 22 is mounted on top of the cabinet and drives the dasher mechanism in the freezer. The freezer itself may be of any suitable or well known construction. While I have shown for illustrative purposes brine as the cooling medium for both the cabinet and the freezer it should be manifest that the cabinet or the freezer or both might if preferred be cooled by direct expansion of the refrigerating medium employed in the refrigerating machine.

The cans 23 are used for storing the cream while it is being hardened, being filled from the freezer while the ice cream is still in a somewhat semi-solid condition. These cans are placed in the compartments 24, 25, 26 or 28. Each of the compartments is surrounded by the body of brine which is cooled by means of the coils 27. It is obvious that the number of compartments and the number of hardening cans may be varied to suit the conditions of any establishment.

In the next compartment to the right of the compartments containing the cans there is provided another compartment 28 in which may be stored packages of ice cream which have been filled from the freezer for hardening or dispensing.

To the right of the package compartment the shallow receptacles 29, 30 and 31 are provided which may be used for containing such things as whipped cream, crushed fruit and nut meats if desired. The cross sectional view in Fig. 4 follows the irregular line 4—4 in Fig. 1 and indicates that the space in between these shallow receptacles is filled with cork and wood or other suitable insulating material which will prevent the freezing of the articles contained in these receptacles and which will also serve to partially insulate the brine carried in the hardening compartments from the brine carried in the compartments to the right of the adjacent shallow receptacles.

In the last section at the right there are located the cans 32 which contain the ice cream which is to be dipped for service at the fountain, at the nearby tables or for service at the curb. The purpose of separating this compartment 33 from the hardening compartment is to enable one to maintain a somewhat higher temperature about the ice cream which is necessary when it is to be dipped. Each of the cans is located in suitable rectangular compartments 34 and 35.

The refrigerant which flows through the coils 27 is to be supplied by any suitable refrigerating machine. It will enter preferably through the pipe 36 and circulate through the various coils 27 in the hardening compartment and then will flow through the connecting pipe 37 into the tempering compartment 33 to circulate through the coils 38, thus cooling the separate body of brine which surrounds the rectangular cans which contain the ice cream to be dipped. The flow of refrigerant could be reversed. It is important to provide in the ice cream dispensing or dipping compartment this separate body of brine independent of the brine in the hardening compartment so that the ice cream being dispensed may have a higher temperature and also that the brine about the hardening cream may not be warmed too much by the heat absorbed by the brine in the dipping compartment. The refrigerant flows from the coils 38 through the outlet 39 back to the refrigerating machine. The refrigerating machine itself, which need not be shown here, may be located in any convenient place in the store but preferably would be located in the basement. Of course, more than one refrigerating machine may be used.

Part of the equipment for rendering a complete fountain service should include various syrup tanks and other tanks which contain the ingredients for the various combination dishes and the mixed drinks which are served. These tanks are provided in this invention and are the tanks 41 which are to be mounted as shown clearly in Fig. 2. The pumps 42 are provided for discharging the contents of these tanks. Each syrup tank will be mounted with its lower end extending downwardly into a longitudinal compartment 43. One side of the tank will contact with a metal plate 44, which plate is integral with the plate 45 and the remaining surfaces of the lower part of the syrup tank are exposed to the atmosphere in the compartment 43. The plate 45, which contacts with the atmosphere just above the brine and cans 32, is therefore cooled to a very low temperature by the cool air which lies above the ice cream and brine, yet keeps the briny air away from the syrup cans. The heat within the syrup is naturally conducted into the atmosphere within the chamber 43 and is conducted from that atmosphere by the plate 45 and also by the vertical plate 46 against which the brine lies. In this manner a sufficiently low temperature is maintained in the chamber 43 indirectly by means of the brine which is carried in the ice cream compartments. This atmosphere will ordinarily have a temperature range from 40° to 50° and will keep the syrup in a cool condition guaranteed to preserve its good qualities and to prevent a mixed drink from being warmed by the addition of a warm syrup. Not only are the syrups and other ingredients for the various concoctions kept cool but they are also located in a convenient and readily accessible position.

As will be observed by reference to Fig. 1 each and every one of the compartments is covered by suitable covers of usual construction hinged or otherwise mounted.

In utilizing this invention it is customary to store water in the compartment surrounding the coils 5 and 6. This water will ordinarily be frozen in its portions lying closest to the brine in the adjacent hardening cabinets. However, all of the water in this compartment does not freeze, the water immediately surrounding the coils being kept slightly above the freezing point because the water continuously absorbs heat from the water coils and because the ice on the walls also retards freezing of the water near the coils. The compartment 3 which contains the mix is cooled sufficiently due to its proximity to the cold water which surrounds the coils 5 and 6 so that a temperature of 40° to 45° is normally maintained in the ice cream mix. Due to the fact that this mix swells 100% in volume when it is subsequently frozen into ice cream it is more economical in the matter of storage space to store a supply of the mix than to store the frozen cream. Also a temperature of 40° to 45° F. is sufficiently low for the storing of the mix, while a temperature of −5° to +10° F. is preferred for storing frozen cream. The cost of refrigerating one gallon of unfrozen mixture is therefore much less than the cost of refrigerating the two gallons of frozen cream.

The semi-frozen cream discharged from the freezer in a semi-solid condition will have a temperature of approximately 20° to 28° F. and may be poured through chutes directly into the hardening cans which are already in the hardening compartment, or into small containers, or may be run into individual service cups or edible carriers. The cream then will be immediately served or cooled further in the hardening compartment to harden it. Of course, the freezer may also be used for making sherbets and water ices.

The temperature of the brine in the hardening compartment should be maintained at about 5° below zero, while it is best to maintain a temperature of about 10° above zero F. in the compartment 33 where is located the cream for dipping. This latter higher temperature is necessary in order that the cream may not be too stiff for easy dipping and also in order that it will not be served in a condition too cold for immediate eating. The higher temperature in the dispensing compartment is obtained by reason of continuous absorption of heat through the walls surrounding this compartment and by heat absorption from the atmosphere due to frequent lifting of the compartment covers when ice cream is being dipped. The thick wall of insulation between the two bodies of brine helps to maintain the temperature differential between the two brines. There are also fewer turns of the coils in the dispensing compartment than there are in the hardening compartment. The fact that the temperature of the refrigerant flowing through the coils in the dispensing compartment has been raised somewhat in passing through the hardening compartment also contributes toward a higher temperature in the dispensing compartment than in the hardening compartment.

By means of the control of heat provided in this construction storage places are provided for all of the foods and food ingredients required for a complete fountain service and the various articles are stored within a unitary structure at different temperatures, each article having the temperature best suited for its preservation and use.

Having this equipment at hand, each proprietor can mix his own distinctive flavors for ice creams, water ices or sherbets and can provide his clientele with the ice creams which are suited to their tastes as he ascertains them. In order to buy at the most favorable prices in the past he was compelled to accept the same flavors that the neighboring ice cream stores also carried, but now he can use secret formulæ and maintain that distinctiveness which will establish for him an individual reputation. Furthermore, when peak demands occur he can make new ice cream rapidly in his own establishment without departing from the standards of his output and need suffer no loss of business due to inability to supply the demands. In addition to the above advantages he can make the ice cream in full view of the customers who buy it so that they may assure themselves of the cleanliness of the conditions under which it is being made.

The entire cabinet should have a suitable external insulation, such as the insulated floor 47 and the insulated side walls 48 and the end walls 49. This insulation may consist of any suitable material, for example, cork or other good insulators.

It should be understood that the single embodiment illustrated in the drawings has been selected for illustrating the nature of the invention, and that its scope is not limited to details of this single embodiment but in fact includes other modifications which may be evolved and which will yet remain within the spirit and scope of the claims which follow.

Having shown and described this invention I claim:

1. A freezer fountain comprising a unitary structure having an ice cream hardening compartment containing a heat transferring fluid, an ice cream dispensing compartment containig a separate heat transferring fluid, means for conducting a refrigerant through both fluids for cooling them, a freezer, means for circulating fluid from one of said compartments through the freezer and returning it to one of said compartments, and syrup tanks mounted on said structure, sealed from but in heat conducting relation to one of said compartments whereby said tanks are cooled but protected against air circulation from said compartments.

2. A freezer fountain comprising a unitary structure having an ice cream hardening compartment adapted to contain a non-freezing heat transferring fluid, an ice cream dispensing compartment adapted to contain a separate independent quantity of non-freezing heat transferring fluid, means for cooling the liquid in both of said compartments, a freezer, means for withdrawing liquid from one of said compartments circulating it through the freezer and returning it to said compartment, a syrup can container mounted on said structure and sealed from said compartments and syrup cans in said container contacting with the side walls thereof, and means establishing a heat conducting relation between said cans and one of said compartments whereby the cans are cooled.

3. A freezer fountain comprising a unitary structure having an ice cream hardening compartment containing a body of non-freezing liquid, an ice cream dispensing compartment containing a separate independent body of non-freezing liquid, means for conducting a refrigerant through both said bodies for cooling them, a freezer, circulating means adapted for conducting liquid from one of said bodies and for circulating it through the freezer and for returning it to one of said bodies, a syrup tank compartment mounted on said structure containing syrup tanks and an atmosphere in contact with the side walls of said tanks, and means for conducting heat from said tanks and from said atmosphere to another separate atmosphere lying above one of said bodies of solution and for sealing the two atmospheres apart.

4. A freezer fountain comprising a unitary structure having an ice cream hardening compartment which contains a body of non-freezing solution, an ice cream dispensing compartment which contains a separate independent body of non-freezing solution, means for conducting a refrigerant through each of said bodies for cooling them, a freezer, circulating means adapted for conducting solution from the hardening compartment to the freezer and for circulating it through the freezer and for returning it to one of said bodies of solution, syrup tanks mounted on said structure, and means for conducting heat from the syrup tanks to the atmosphere lying above the solution in one of said compartments and for sealing said atmosphere apart from the air contacting with the syrup tanks.

5. A freezer fountain comprising a unitary structure having an ice cream hardening compartment which contains a body of non-freezing solution, an ice cream dispensing compartment which contains a separate independent body of non-freezing solution, means for conducting a supply of refrigerant first through the solution in the hardening compartment and thereafter through the solution in the dispensing compartment for cooling both bodies of solution, a freezer, circulating means adapted for conducting solution from one of said bodies and for circulating it through said freezer and for returning it to one of said bodies, syrup tanks mounted on said structure, and means for conducting heat from the syrup tanks to the atmosphere lying above the solution in one of said compartments and for sealing said atmosphere apart from the air contacting with the syrup tanks.

6. A freezer fountain comprising a unitary structure having an ice cream hardening compartment which contains a body of non-freezing solution, an ice cream dispensing compartment which contains a separate independent body of non-freezing solution, means for conducting a refrigerant through both said bodies for cooling them, a water cooling compartment adjacent to and insulated from one of said bodies of solution having containers therein for plain water and carbonated water, a precooling compartment for containing unfrozen ice cream mixtures located adjacent to the water cooling compartment on a side of the latter remote from said adjacent body of non-freezing solution, a freezer, circulating means adapted for conducting solution from one of said bodies through the freezer and back to one of said bodies, syrup tanks mounted on said structure, and means for conducting heat from said syrup tanks to one of said bodies of solution and for sealing the atmosphere above said solution apart from said tanks.

7. A freezer fountain comprising a unitary structure having an ice cream hardening compartment containing non-freezing solution for cooling and hardening frozen ice cream, an ice cream dispensing compartment insulated from and horizontally adjacent to said hardening compartment containing a separate independent body of non-freezing solution for cooling ice cream being dispensed in the fountain service, means for conducting a refrigerant first through the solution in the hardening compartment and thereafter through the solution in the dispensing compartment for cooling both solutions, a freezer mounted on said structure above and adjacent to the solution in the hardening compartment, means for conducting solution from the hardening compartment and for circulating it through said freezer and returning it to one of said bodies of solution, syrup tanks mounted on said structure above and adjacent to the dispensing compartment, and means for conducting heat from said tanks to the atmosphere above the solution in the dispensing compartment and for sealing said atmosphere apart from the tanks.

8. In a fountain, an ice cream hardening compartment containing a body of non-freezing solution, an ice cream dispensing compartment containing a separate independent body of non-freezing solution, means for conducting a refrigerant through both bodies of solution for cooling them, a freezer, circulating means adapted to conduct solution from one of said bodies through said freezer and back to one of said bodies, and heat insulating means disposed between the two separate bodies of solution for retarding heat transfer from one to the other.

9. In a freezer fountain, an ice cream hardening compartment containing a body of non-freezing solution, an ice cream dispensing compartment containing a separate body of non-freezing solution, an ice cream freezer, circulating means adapted for conducting solution from the hardening compartment through said freezer and back to one of said bodies of solution, and pipes arranged for conducting a supply of refrigerant first through the solution in the hardening compartment and thereafter through the solution in the dispensing compartment.

In witness of the foregoing I affix my signature.

CHARLES TAYLOR.